E. THOMSON.
OIL OR GAS ENGINE.
APPLICATION FILED JULY 19, 1899.

924,856. Patented June 15, 1909.

WITNESSES
Henry O. Westendarp
Dugald McKillop

INVENTOR
Elihu Thomson

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

OIL OR GAS ENGINE.

No. 924,856.　　　Specification of Letters Patent.　　　Patented June 15, 1909.

Application filed July 19, 1899. Serial No. 724,344.

*To all whom it may concern:*

Be it known that I, ELIHU THOMSON, a citizen of the United States, residing in Swampscott, in the county of Essex and State of Massachusetts, have invented certain new and useful Improvements in Oil or Gas Engines, of which the following is a specification.

The object of my present invention is to construct an oil, gasolene or gas engine which shall secure the advantages of the two-cycle method of working or "transfer type" as it is called, *i. e.* the burning of the combustion charge once every revolution or every two strokes in a single cylinder engine, and at the same time to secure the complete separation of the incoming fuel charge from the outgoing or exhaust charge.

In my Patent #696,518, dated April 1, 1902, I have shown certain elements of my invention as applied to two-cycle engines of what I call the two-cycle transfer type, that is, one in which there are two cylinders in communication, and the pistons move in the two cylinders oppositely.

In my patent referred to, the exhaust ports are uncovered by the piston at the end of its outward stroke, allowing the burned charge to escape, and fresh air is introduced between the two pistons, this introduction of fresh air being subsequently followed by a fuel charge generally when the exhaust ports are about closing or have closed, the fuel charge being under compression. In my present invention, however, while it agrees with the former in introducing a charge of air between the fuel charge and the exhaust, I dispense with the compressing piston and use for each cylinder one single piston. I secure, however, the division of the exhaust charge from the incoming fuel charge by the introduction of fresh air between them, as in the former invention. In this way the incoming fuel charge is prevented from mixing with the outgoing exhaust charge and the gases are arranged from the piston back, after the exhaust, about as follows: A layer of exhaust gas mixed with air, then a layer of air alone, and then the fuel charge mixed with air. These are compressed and the fuel charge ignited with an ignition tube or similar device, the flame shooting forward within the body of air in excess, the piston moves forward, the exhaust ports are uncovered and the new charge of air is inserted between a new charge of fuel mixture and the outgoing exhaust gases.

Figure 1:
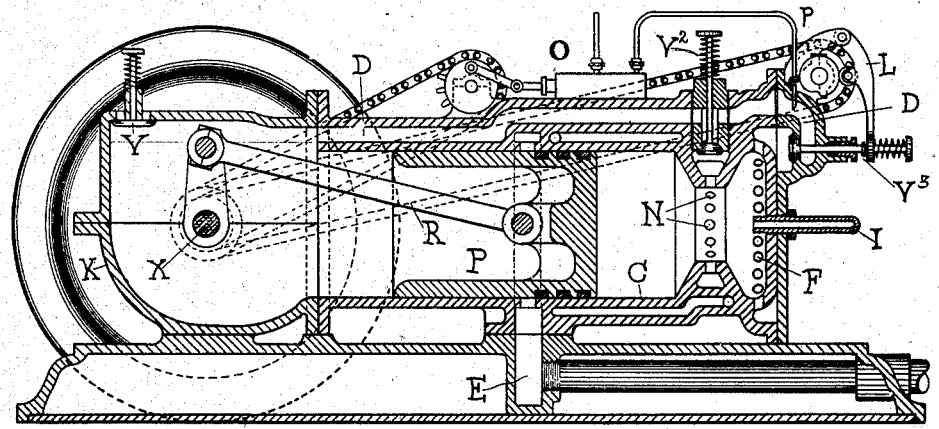
Figure 2:
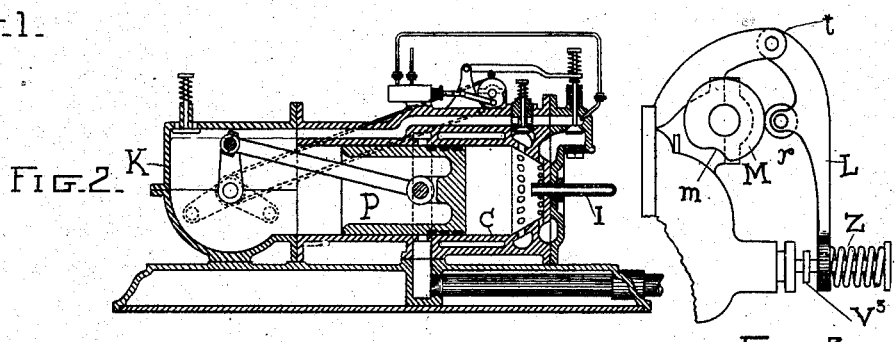
Figure 3:
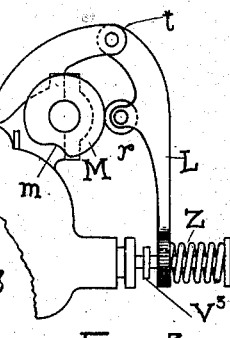
Figure 4:
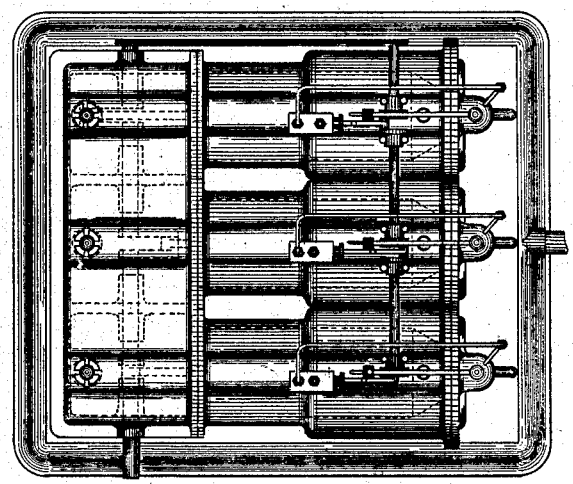

This will be better understood by reference to the figures; Figure 1 being an elevation in section of an engine constructed in accordance with my invention. Fig. 2 shows a modification also as an elevation in section; Fig. 3 a detail of the valve operating mechanism; Fig. 4 shows in plan a three cylinder engine, the three cylinders being combined to turn a single crank shaft; and Fig. 5 is a modification of the back end of the cylinder.

In Fig. 1, X is a crank shaft with a crank inclosed in an outer case K which is open for the entrance of air by an automatic valve Y when the pressure falls therein. A connecting rod R journaled to the crank and to the piston P transmits motion from one to the other as the piston moves back and forth during the revolutions of the crank. This piston P plays within a cylinder C. When the piston is forward the exhaust ports, arranged around the cylinder as perforations in the cylinder wall at E, are opened, allowing the exhaust gases to escape. At the back end of the cylinder C are two sets of openings into the clearance space. This, as shown in Fig. 1, is narrowed at N, and has a series of openings in the narrow part N, and a duct surrounding this communicates with the openings in the narrow portion N. These openings are for the introduction of air alone, and the entrance of the air to the openings is controlled by suitable check valves, one or more, as indicated at $V^2$. The valve $V^2$ controls the air duct D connecting the crank case K with the openings at N. Another valve $V^3$ serves in like manner to control the fuel charge entering the openings close to the back of the cylinder marked F. These are shown as a circle ranged around the cylinder head and are connected by a duct into which the valve $V^3$ opens, which duct is clearly shown in the figure. An oil pump O, driven by suitable mechanism connected with the engine itself, pumps specific quantities of oil through a pipe *p* into the duct D near the valve $V^3$ where it is mixed with the air therein. The supply of oil is, of course, obtained from any suitable reservoir containing it. Gasolene or kerosene oil may be used. If gas is to be employed as fuel then the pump O is made larger than when oil is used. An ignition tube I represents an igniting device; (it may be an electric igniter or other means) working in the ordinary way, and kept hot by an external flame. Geared to the crank-shaft is a valve mechanism more clearly seen in Fig. 3, which valve mechanism controls the action of the valve $V^3$ by its stem being acted on by the lever L. A cam M is revolved synchronously with the shaft X, and against it bears a roll $r$ carried by the lever L which is pivoted to a stationary pivot at $t$. The lever L as pressed outward by the roll $r$, bearing against the high portion of the cam M for the major part of the revolution, holds the valve stem V out through the agency of an elastic spring Z which is compressed by said cover as it moves outward. This keeps the valve shut. When, however, the notch $m$ in the cam M comes around so that the roll $r$ can pass into the notch, the spring Z is relieved and valve $V^3$ is pushed open by the pressure in duct D. Of course it will be understood that positive action of the valve might be secured by having it closed by a spring in any suitable way and pushed upon positively by a lever such as L, operated by the cam, and this would be an alternative construction to the one shown, and in some cases to be preferred. The spring, however, which closes valve $V^2$ is made a little stiffer than the spring Z which closes valve $V^3$ but when the lever L is held out by the cam M the spring is so compressed that its tension is greater than that of the spring of the valve $V^2$, so that very little gas would pass the valve $V^3$ from duct D, but would in preference pass valve $V^2$ until the action of the cam relieved the spring Z, when valve $V^3$ would open more freely than $V^2$. These actions of the valves are timed to take place successively just after the opening of the exhaust ports E by the piston P moving forward to the limit of its stroke.

Fig. 2 shows a section in which, while the parts are substantially the same, there is no narrowed portion N, but instead, the back end of the cylinder is coned or might be left cylindrical. In other respects the structure is substantially the same as in Fig. 1. Fig. 2 is a section of such an engine as is shown in plan, Fig. 4, with three cranks at 120° apart, three pistons and three separate cylinders with pump devices for supplying fuel successively to the clyinders and valve mechanism for operating valves in suitable succession, Fig. 4 being nothing more than the combination of several engines in one unit.

Figure 5:
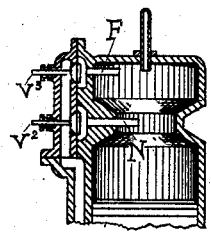

Fig. 5 shows that instead of a series of openings extending around the cylinder for the entrance of air or fuel charges as in Fig. 1, a slot or port may be employed, such as a single slot extending part way around. The slots, respectively, are indicated by letters N and F.

No governing arrangement is shown in connection with the engine, it being understood that a centrifugal governor may be employed which cuts off the entrance of fuel and air upon the attainment of a certain speed, or which diminishes the amount of fuel and air entering the cylinder. This, however, is no essential feature of the invention as my invention may be applied to work under considerable variations of speed where no governor is admissible, and if speed regulation be desired it will be accomplished on the ordinary principles of reducing or cutting off the fuel charges. The engine has been shown with its cylinder placed horizontally. It is to be understood, of course, that the same principles are applicable to vertical engines or engines in which the cylinders are variously placed with respect to the horizontal.

The operation of the engine is substantially as follows: Assume that a few revolutions are given which have caused a charge of air to be accumulated on the forward motion of the piston in the case K, it being drawn through valve Y when the piston is well into the cylinder. This charge of air compressed moderately in the case K passes through duct D and enters the cylinder by passing from the valve $V^2$ through the openings at N. When, however, this action is continued for a short time the cam M lets down the lever L and the valve $V^3$ is now set more freely than $V^2$ and pressure opens valve $V^3$ allowing air containing gasolene vapor or oil vapor to enter, it being assumed that the back end of the cylinder and the ducts leading thereto have been brought to a sufficient temperature to vaporize kerosene oil, if that be used as fuel. If gas is the fuel, no prior heating is required. A fuel charge, just after the entrance of air through the passage N is driven in through passages F, the air charge still continuing to flow in less amount through N. Meanwhile the gas exhaust passage E is open and the pressure in C is relieved at E. On the return of the piston the charge is either ignited by an electric igniter or compressed into the ignition tube I during what is the compression stroke, and at or near the end of this stroke it fires, and the rich mixture at the back end of the cylinder near F burns in the cylinder in excess of air nearer the piston, and is very completely consumed. The explosion pressure drives the piston outward and forward, the piston uncovers the exhaust openings, the hot and expanded gases escaping thereat and the pressure falling. While the said exhaust openings remain open, the compressed air in the case K can find its way through valve $V^2$ from duct D and a little later through valve $V^3$ from duct D, mixed, however, in this case with the fuel charge. There is thus the insertion of a diaphragm, so to speak, of fresh air between the fuel charge and the exhaust gases by the passages at N furnishing the diaphragm of air. This effectively separates the incoming fuel charge from the outgoing exhaust charge, and the main object of my present invention is to be able to burn the fuel charge completely in excess of air unmixed with exhaust gas, and thus avoid noxious odors, and at the same time to prevent the escape at the exhaust passages of any of the unburned new charge and this is effected by my invention as described.

The action of the engine, Figs. 2 and 4, is the same, except that the torque is more nearly constant as one cylinder follows after another in exerting the power. The combined engine, therefore, Fig. 4 would require much less of a fly-wheel than a single engine, Fig. 1. It is, of course, assumed in Fig. 1 that a fly-wheel exists of sufficient weight to carry the engine through those portions of a revolution where no power is given out to the crank shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as my invention, and desire to secure by Letters Patent, is:

1. In an oil or gas engine, the combination of a cylinder and a piston moving therein, exhaust ports in the cylinder wall near the outer end of the cylinder which are opened and closed by the piston as it moves over them while it is near the outer limit of its stroke, fuel ports in the cylinder wall near its inner end, another set of ports in the cylinder wall intermediate said exhaust and fuel ports which discharge fluid transversely of the cylinder to form an air or gaseous diaphragm between the outgoing exhaust gases and the entering fuel charge, ducts and valves supplying said intermediate and fuel ports, and means for regulating the operation of the valves which causes the valve controlling the supply to the intermediate ports to open shortly after the opening of the exhaust ports and shortly before the opening of the valve controlling the fuel supply.

2. In a gas or oil engine, a closed crank case arranged with a suitable valve to act as an air pump, a cylinder having a piston moving therein, exhaust ports near the outer end of the cylinder which are opened and closed by the piston as it moves over them, a duct conveying air from the crank case to two sets of ports opening into the cylinder space, one nearer the piston than the other, the former passing only air in a direction transverse to the cylinder and intermediate its ends to form an air or gaseous diaphragm, and the latter passing an air and fuel mixture to the cylinder at a point farther from the piston, fuel supplying means coöperating with the duct and the second set of ports, in combination with mechanism whereby the passage of air through the air ports is given precedence in time to the passage of the air through the fuel ports, such mechanism consisting of a set of valves, one for the air ports and one for the fuel ports, and a rotating shaft bearing a cam and actuating a lever for allowing the fuel admission valve to open at predetermined intervals.

3. In a gas or oil engine, a cylinder having a piston moving therein, two separated sets of independent ports in the cylinder wall forward of but near the end of the cylinder and opening into the clearance space thereof, and mechanism whereby the set of ports nearer the piston are opened in precedence to the other or fuel ports situated at the far end of the clearance space to discharge air across the cylinder to form an air or gaseous diaphragm extending between the exhaust gases and the fuel charge.

4. In an oil or gas engine, a cylinder having a piston moving therein, exhaust ports in the cylinder wall uncovered by the piston near the end of its outward stroke, a compression case or chamber for storing air compressed by the piston on its outward stroke, a duct feeding said compressed air into the cylinder, two sets of ports through which air from said chamber passes into the cylinder, valves controlling the ports, one set of ports being situated in the cylinder wall intermediate the other or fuel ports and the exhaust ports and passing air alone to the cylinder clearance space to form an air or gaseous diaphragm between the exhaust ports and the fuel ports, and fuel supplying means coöperating with the duct and the valve controlling the fuel ports to supply fuel charges to the cylinder.

5. In an internal combustion engine, a piston, a combustion chamber provided with a set of exhaust ports at the outer end of the space swept by the piston, a set of fuel ports at the opposite end of the chamber, and a set of air ports located in the wall of the chamber intermediate its ends which discharge transversely of the chamber, means supplying fuel to the fuel ports, means for supplying air under pressure to the air ports, spring controlled valves for regulating the flow through the air and fuel ports, and means for periodically varying the tension of one of the controlling springs to regulate the sequence of operation of the valves.

6. In an internal combustion heat engine, a combustion chamber, and a piston moving therein, said chamber being provided with fuel ports, exhaust ports, and an intermediate set of air ports in the wall of the chamber which discharge air transversely of the chamber to form an air or gaseous diaphragm between the exhaust gases and the fuel charge, the exhaust ports being opened by said piston as it approaches the outer end of its stroke, valves for said fuel ports and said intermediate air ports, and means for controlling the opening of said valves, said means being arranged to cause the air valve to open after the opening of the exhaust ports and slightly prior to the opening of the fuel valve.

7. In an internal combustion engine, a combustion chamber constricted intermediate its end, said chamber being provided with fuel ports located adjacent one of its ends, exhaust ports located adjacent its opposite end, and air ports located in the constricted portion of the chamber which discharge transversely to its axis between the exhaust and fuel ports.

In witness whereof, I have hereunto set my hand this 17th of July, 1899.

ELIHU THOMSON.

Witnesses:
　DUGALD MCKILLOP,
　JOHN MCMANUS.